United States Patent [19]
Seki et al.

[11] 4,064,466
[45] Dec. 20, 1977

[54] LINEARLY POLARIZING INTERNAL MIRROR TYPE GAS LASER TUBE

[75] Inventors: Fumio Seki; Taizo Oikado; Keiichi Shintaku, all of Tokyo, Japan

[73] Assignee: Nippon Electric Company, Ltd., Tokyo, Japan

[21] Appl. No.: 733,777

[22] Filed: Oct. 19, 1976

[30] Foreign Application Priority Data

Oct. 23, 1975 Japan .................... 50-127675

[51] Int. Cl.² .................... H01S 3/00
[52] U.S. Cl. .................... 331/94.5 D; 331/94.5 G
[58] Field of Search .................... 331/94.5 D, 94.5 G

[56] References Cited
U.S. PATENT DOCUMENTS 3,790,900  2/1974  Golser .................... 331/94.5
3,851,275  11/1974  Furuse .................... 331/94.5 D

OTHER PUBLICATIONS

Kirk, I.B.M. Tech. Discl. Bull., vol. 16, No. 11, Apr. 1974, p. 3774.

Primary Examiner—Martin H. Edlow
Attorney, Agent, or Firm—Hopgood, Calimafde, Kalil, Blaustein & Lieberman

[57] ABSTRACT

A gas laser tube includes a metal supporting body installed at one end of the laser tube. A seal casing is secured to the supporting body, and accommodates at least one cylindrical holding body having one end cut to a Brewster angle, and an optical flat plate installed in close contact with the cut surface of the holding body. A reflecting mirror is secured to an end of the seal casing.

8 Claims, 6 Drawing Figures

LINEARLY POLARIZING INTERNAL MIRROR TYPE GAS LASER TUBE

The present invention relates generally to gas laser tubes, and more particularly to the construction of Brewster windows used in a linearly polarizing internal mirror type gas laser tube.

An internal mirror type gas laser tube consists essentially of a vacuum enclosure, a capillary, a pair of mirrors installed at both ends of the capillary in alignment with it axis, and anode and cathode electrodes. The application of a voltage across the two electrodes causes a discharge in the capillary, whereby a laser medium enclosed in the capillary is excited, resulting in population inversion. The excited particles react on light beams reflected back and forth in a resonator formed of a pair of mirrors, thereby initiating laser oscillation.

In a gas laser tube of such type, several spectral components are set up concurrently. Although the spectral components are all linearly polarized, the overall laser output is not linearly polarized because mutually adjacent spectra are orthogonal to each other. To obtain a linearly polarized laser output, a polarizer has been used. In practice, the intensity of light after the polarizer is hardly more than half that of the total laser oscillation output. Furthermore, with changes in the distance between laser resonators, the intensity of the individual spectral component changes along the Doppler-broadened gain curve due to the Doppler effect. As a result, the laser output past the polarizer varies even though the sum of the individual spectral components of the incident laser beam is constant. For this reason, an output laser beam, when used as a light source in optical communications, optical data processing, or the like, is preferably linearly polarized.

Ideally, linearly polarized laser oscillation can be obtained by securing optical flat members at the Brewster angle to both ends of the capillary in an optical resonator formed of a pair of mirrors. To this effect, in a prior art linearly polarizing internal mirror type gas laser tube, the two ends of the capillary are polished to the Brewster angle, and glass plates are secured to the polished surfaces by the use of low-melting point glass, bonding agent, or the like. In another approach a supporting member is installed axially on the capillary where the glass plates are mechanically secured to the supporting member at the Brewster angle. In the former construction, the Brewster windows usually serve as vacuum seals, which requires highly precise polishing of the ends of the capillary and intricate sealing skill. In the latter construction the use of the supporting member complicates the overall structure. In summary, the prior art approaches to obtaining polarized laser oscillation are not efficient or economical.

It is, therefore, an object of the invention to provide a linearly polarizing internal mirror type gas laser tube which can be efficiently manufactured in quantity and at low costs.

With this and other objects in view, the present invention provides a linearly polarizing internal mirror type gas laser tube which comprises a hollow metal supporting bodies installed at both ends of the gas laser tube. A seal casing is secured to the supporting body, and accommodates at least one hollow cylindrical internal holding body having one of its ends cut to Brewster angle, and an optical flat plate installed in close contact with the cut surface of the holding body. A reflecting mirror is secured to an end of the seal casing.

The gas laser tube according to the present invention utilizes the fact that different substances have different coefficients of thermal expansion. The fact that the length increment of the external supporting body due to the thermal expansion is larger than the sum of the length increments of the internal constituent elements at the bonding temperature causes, with a fall in temperature, a compressive force that is exerted upon the optical flat plate, permitting the optical flat plate to be mechanically fastened into position.

According to the invention, therefore, the process for mounting the optical flat plate is considerably simplified, which enables gas laser tubes to be readily manufactured at low costs.

Further objects, features and advantages of the invention will become more apparent from the following detailed description taken in conjunction with the accompanying drawings, wherein:

FIG. 3b is a cross-sectional view taken across the lines B-B' in FIG. 3a;

Figure 1:
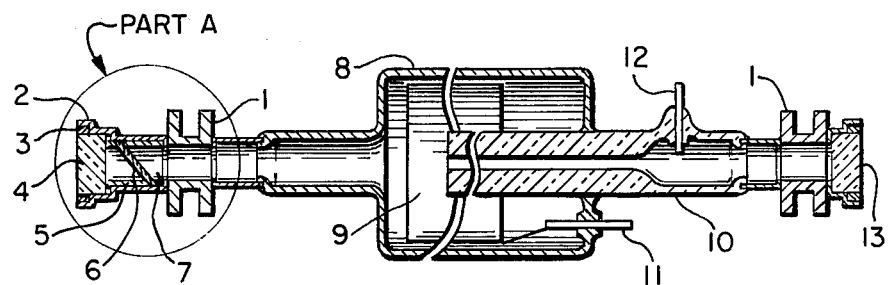
FIG. 1 is a longitudinal cross-sectional view of a linearly polarizing internal mirror type gas laser tube according to an embodiment of the invention.
Figure 2:
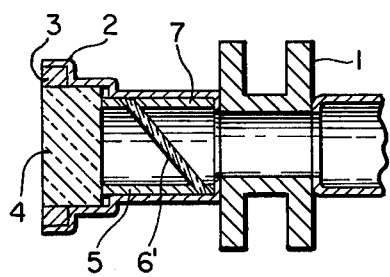
FIG. 2 is a cross-sectional view of part A shown in FIG. 1.

Referring to FIGS. 1 and 2, there is schematically shown the construction of a gas laser tube, which comprises a pair of cylindrical ductile metal supporting bodies 1 at each end of the tube. Seal casings 2 are fastened to the metal supporting bodies 1 by brazing or the like, and are used as external holding bodies for holding a Brewster window. A low-melting point glass 3 is provided to hermetically fuse a mirror 4 into the seal casings. As shown in FIG. 1 and in greater detail in FIG. 2, one of the supporting bodies 1 includes hollow cylindrical internal holding bodies 5 and 7 made of metal of glass with one end cut to a Brewster angle for securely holding an optical flat plate 6 at the Brewster angle. The gas laser tube further includes an envelope 8 for maintaining vacuum. A cathode 9 is provided within the envelope, and one end of a capillary 10 extends into the envelope. A cathode lead 11 extends into the envelope and is connected to cathode 9, and an anode 12 is fused to the capillary.

According to the invention, the relationship between the dimensions and thermal expansion coefficients of the seal casings 2, mirrors 4, cylindrical holding bodies 5 and 7, and optical flat plate 6 along the axis of the laser tube are all predetermined to achieve the desired results. Specifically, the dimensions and materials of these constituent elements of the gas laser tube are determined on the following condition:

$$l_0 \alpha_0 > l_1 \alpha_1 + l_2 \alpha_2 + l_3 \alpha_3 + l_4 \alpha_4$$

where $l_0$ is the length of the seal casing 2 at ordinary temperatures before the sealing process, and $\alpha_0$ is the thermal expansion coefficient of the seal casing 2; $l_1$, $l_2$, $l_3$ and $l_4$ are the lengths at ordinary temperatures; and $\alpha_1$, $\alpha_2$, $\alpha_3$ and $\alpha_4$ are the thermal expansion coefficients of the mirror 4, first internal holding body 7, glass plate 6, and second internal holding body 5, respectively. This condition signifies the fact that the length increment of the seal casing due to thermal expansion is larger than the sum of the thermal length increments of the elements installed into the seal casing. In this example, the seal casing 2 is of 426 alloy and is 15 mm long; the mirror 4 and the optical flat plate 6 are of optical glass and are 5 mm and 1.7 mm long, respectively; and the internal holding bodies 5 and 7 are of Kovar alloy (Kovar: trademark of the Stupakoff Ceramic & Mfg. Co.), and the sum of their lengths is 8.3 mm. The dimensions and materials of these elements are chosen so that an optimum compressive stress is applied to the optical flat plate 6 according to the melting point of the low-melting point glass 3.

The optical flat plate 6 is fastened in position in the following manner. The capillary 10 to which the anode 12 is fused is fused to the envelope 8 which, in turn, is equipped with the cathode lead 11 connected to the cathode 9. The metal supporting member 1 and the seal casing 2 are fastened together into a unit by brazing; the unit is mounted to an end of the envelope 8. The resultant structure is placed with the seal casing 2 facing upward perpendicularly, and the first hollow cylindrical internal holding body 7, optical flat plate 6, second hollow cylindrical internal holding body 5, mirror 4 and low-melting point glass 3 are inserted into this structure in this order. The low-melting point glass 3 is preferably in the form of a ring made of low-melting point glass powder combined by press.

FIG. 2 schematically shows part A of the gas laser tube shown in FIG. 1. In the forming process, the part A is heated to a temperature of about 500° C to melt the glass 3 and then is cooled to a temperature where the glass 3 is solidified. The reflecting mirror 4 is fitted in the seal casing 2 at the outer end so that the mirror 4 is located at a position determined by the sum of the axial lengths of the internal holding bodies 5 and 7 and the optical flat plate 6, the lengths being dependent upon the temperature at which the low-melting point glass 3 is solidified. When the part A is cooled to ordinary temperatures where the gas laser tube is normally used, the optical flat plate 6 receives a compressive force axially due to the difference in the thermal expansion coefficients between the seal casing 2, second internal holding body 5, optical flat plate 6 and second internal holding body 7. This compressive force causes the optical flat plate 6 to be securely retained between the Brewster ends of the internal holding bodies 5 and 7. Thus, the optical flat plate 6 is immovably held in position.

According to the invention, the internal holding bodies 5 and 7 can readily be formed at a low cost by known metal press, glass moulding or similar process. The optical flat plate 6 can be fastened in position at the Brewster angle concurrently when the mirror is hermetically sealed by the low-melting point glass to simplify the production process.

Figure 3A:
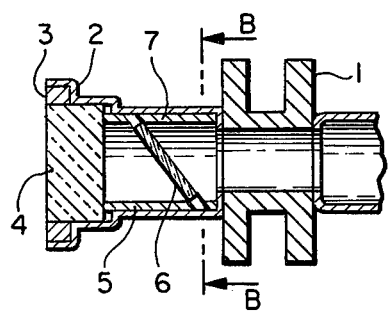
FIG. 3a is a longitudinal cross-sectional view of an optical flat plate mounting part of the gas laser tube of the invention.
Figure 3B:
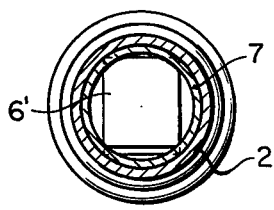

The optical flat plate is not necessarily of a particular shape, such as elliptical or circular, but may be rectangular as shown in the embodiment thereof illustrated in FIGS. 3a and 3b, in which the optical flat plate 6' is in the form of a rectangle, which can be cut out of a large glass plate with a glass cutter, to lower the production cost. Furthermore, the use of the rectangular plate 6' facilitates the evacuation of air from the space between the optical flat plate and the reflecting mirror.

Figure 4:
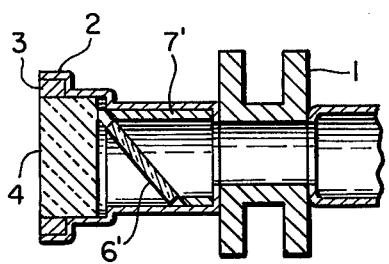
FIG. 4 is a longitudinal cross-sectional view of another optical flat plate mounting part for use in the gas laser tube of the invention.

In this embodiment, two internal holding bodies are used to fasten the optical flat plate in position. Instead, the optical flate plate may be fastened in such a manner that an end of the optical flate plate is brought into direct contact with the inner surface of the reflecting mirror without using the other internal holding body. FIG. 4 shows a construction in which a hollow cylindrical internal holding body 7' and a rectangular optical flat plate 6 are fitted into the seal casing 2, and the reflecting mirror 4 is hermetically sealed into the seal casing by low-melting point glass so that part of the edge of the reflecting mirror 4 presses the rectangular optical flat plate 6 at two edges.

Figure 5:
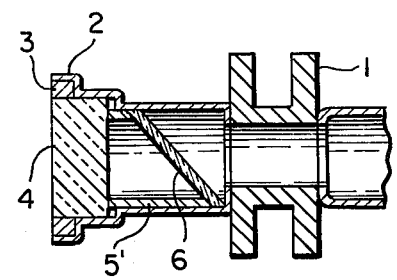
FIG. 5 is a longitudinal cross-sectional view of an alternative form of an optical flat plate mounting part for use in the gas laser tube of the invention.

FIG. 5 shows another construction in which an elliptical optical flat plate 6 and a hollow cylindrical internal holding body 5' are fitted into the seal casing 2, and the reflecting mirror 4 is hermetically sealed into the seal casing by low-melting point glass so that a compressive stress is exerted on the optical flat plate 6.

Thus, as described above, the invention makes it possible to manufacture linearly polarizing internal mirror type gas laser tubes with ease and at low costs.

Whereas the gas laser tube of the invention has been hereinabove described with respect to several embodiments, it will be apparent that modifications thereto may become apparent to those skilled in the art, which would not necessarily depart from the spirit and scope of the invention.

What is claimed is:

1. A linearly polarizing internal mirror type gas laser tube comprising a hollow metal supporting body installed at an end of the gas laser tube; a seal casing secured axially to said hollow metal supporting body; a first hollow cylindrical internal holding body with one end cut to a Brewster angle; an optical flat plate installed in close contact with the end thereof cut to a Brewster angle; and a second hollow cylindrical internal holding body with one end cut to a Brewster angle installed in close contact with said optical flat plate; said seal casing accommodating said first hollow cylindrical internal holding body, said optical flat plate, and said second hollow cylindrical internal holding body; and a reflecting mirror which is a constituent element of an optical resonator securely fitted into said seal casing at the outer end so that said first hollow cylindrical internal holding body, said optical flat plate, and said second hollow cylindrical internal holding body receive a compressive force.

2. The linearly polarizing internal mirror type gas laser tube according to claim 1, in which the length increment of the seal casing along the axis of the laser tube due to thermal expansion is larger than the sum of the axial length increments of said first hollow cylindrical internal holding body, said optical flat plate, said second hollow cylindrical internal holding body, and said reflecting mirror due to thermal expansion.

3. The linearly polarizing internal mirror type gas laser tube according to claim 2, in which said optical flat plate is a thin, rectangular body, and the portion thereof where a laser beam passes through is optically polished.

4. The linearly polarizing interal mirror type gas laser tube according to claim 2, in which said hollow metal supporting body has two flange-like portions installed coaxially with a plastically deformable hollow cylinder.

5. The linearly polarizing internal mirror type gas laser tube according to claim 4, in which said reflecting mirror is fitted in said seal casing and hermetically sealed by low-melting point glass.

6. The linearly polarizing internal mirror type gas laser tube according to claim 5, in which said seal casing is of 426 alloy, and said first and second hollow cylindrical internal holding bodies are of Kovar alloy.

7. A linearly polarizing internal mirror type gas laser tube comprising a hollow metal supporting body installed at an end of the gas laser tube; a seal casing secured axially to said hollow metal supporting body; a hollow cylindrical internal holding body with one end cut to a Brewster angle; and an optical flat plate installed in close contact with the end thereof cut to a Brewster angle; said seal casing accommodating said hollow cylindrical internal holding body adjacent to said metal supporting body and said optical flat plate adjacent to said internal holding body; and a reflecting mirror which is a constituent element of an optical resonator securely fitted in the outer end of said seal casing, whereby said cylindrical internal holding body and said optical flat plate receive a compressive force.

8. A linearly polarizing internal mirror type gas laser tube comprising a hollow metal supporting body installed at an end of the gas laser tube; a seal casing secured axially to the hollow metal supporting body; and optical flat plate; and a cylindrical internal holding body with one end cut to a Brewster angle; said seal casing accommodating said optical flat plate adjacent to said metal supporting body, said cylindrical internal holding body of which the end is cut to a Brewster angle being in close contact with said optical flat plate; and a reflecting mirror serving as a constituent element of an optical resonator securely fitted in the outer end of said seal casing, whereby said cylindrical internal holding body and said optical plane plate receive a compressive force.

* * * * *